United States Patent
Bruckner et al.

(10) Patent No.: US 10,299,593 B2
(45) Date of Patent: May 28, 2019

(54) RACK, LOAD CARRIER AND METHOD OF PRODUCTION

(71) Applicants: Günter Bruckner, Schnaittenbach (DE); Thomas Bösl, Schnaittenbach (DE); Stefan Ketelaar, Parkstein (DE); Fabian Müller, Mantel (DE)

(72) Inventors: Günter Bruckner, Schnaittenbach (DE); Thomas Bösl, Schnaittenbach (DE); Stefan Ketelaar, Parkstein (DE); Fabian Müller, Mantel (DE)

(73) Assignee: WITRON LOGISTIK + INFORMATIK GMBH, Parkstein (DE)

( * ) Notice: Subject to any disclaimer, the term of this patent is extended or adjusted under 35 U.S.C. 154(b) by 0 days.

(21) Appl. No.: 15/499,041

(22) Filed: Apr. 27, 2017

(65) Prior Publication Data

US 2017/0311721 A1    Nov. 2, 2017

(30) Foreign Application Priority Data

Apr. 28, 2016 (DE) .......................... 10 2016 107 962
Nov. 2, 2016 (DE) .......................... 10 2016 120 869

(51) Int. Cl.
*B65G 1/02* (2006.01)
*A47B 47/02* (2006.01)
(Continued)

(52) U.S. Cl.
CPC ........ *A47B 96/1441* (2013.01); *A47B 47/021* (2013.01); *A47B 47/027* (2013.01);
(Continued)

(58) Field of Classification Search
CPC ... B23P 13/00; A47B 96/1441; A47B 47/027; A47B 96/14; A47B 96/145; A47B 47/02;
(Continued)

(56) References Cited

U.S. PATENT DOCUMENTS 3,142,386 A * 7/1964 Skubic ................. A47B 57/402
                                                      211/182
3,217,894 A * 11/1965 Shewell ............... A47B 57/402
                                                      211/182
(Continued)

FOREIGN PATENT DOCUMENTS

DE    10 2006 007 357 A1    8/2007
DE    10 2009 032 423 A1    1/2011
(Continued)

OTHER PUBLICATIONS

European Search Report issued in Appln. No. 17152081.0 dated Aug. 4, 2017 with English translation of Category of Cited Documents (13 pages).
(Continued)

*Primary Examiner* — Jennifer E. Novosad
(74) *Attorney, Agent, or Firm* — Flynn Thiel, P.C.

(57) ABSTRACT

A load carrier for a rack for disposition at one or more rack uprights and for receiving loads with a load bearing contact surface for the purpose of storing loads and an upright contact surface section for disposition of the load carrier at the upright or uprights, wherein the load bearing surface section extends along the length and width of the load carrier and the upright contact surface section runs along the length and height of the load carrier, wherein the load bearing surface section and the upright contact surface section are disposed transversely to each other to form a support bracket, wherein for the purpose of reinforcing the load carrier, the load bearing surface section and/or the upright contact surface section are part of a hollow profile and/or have one or more corrugations. Also, a rack with corresponding load carriers and a method for making the same.

16 Claims, 4 Drawing Sheets

(51) Int. Cl.
*A47B 96/14* (2006.01)
*B23P 13/00* (2006.01)

(52) U.S. Cl.
CPC ............ *A47B 47/028* (2013.01); *B23P 13/00* (2013.01); *B65G 1/02* (2013.01)

(58) Field of Classification Search
CPC ..... A47B 47/021; A47B 47/028; A47B 96/06; A47B 96/063; A47B 96/067; A47B 96/1416; A47B 96/1443; A47B 96/1466; A47B 2096/1491; A47B 96/066; A47B 96/00; A47B 57/00; A47B 57/30; A47B 57/06; A47B 47/00; A47B 47/0041; A47B 47/005; A47B 47/024; B65G 1/02
USPC ........ 211/191, 183, 189, 192, 190; 248/235, 248/247, 250; 312/265.1
See application file for complete search history.

(56) References Cited

U.S. PATENT DOCUMENTS

| | | | | |
|---|---|---|---|---|
| 3,278,043 A * | 10/1966 | Kimpton | ............. | A47B 57/402 211/191 |
| 3,601,346 A * | 8/1971 | Fenwick | ................ | A47B 57/40 211/183 |
| 3,647,080 A * | 3/1972 | Denny | ................ | A47B 47/027 108/901 |
| 3,862,691 A * | 1/1975 | Mori | ...................... | A47B 57/40 108/156 |
| 4,074,812 A * | 2/1978 | Skubic | .................. | A47B 57/50 211/182 |
| 4,342,397 A * | 8/1982 | Halstrick | ............ | A47B 57/402 211/182 |
| 4,518,279 A * | 5/1985 | Suttles | .................. | E04B 1/5818 211/189 |
| 4,545,490 A * | 10/1985 | Hsiao | ...................... | F16B 12/50 211/182 |
| 4,569,451 A * | 2/1986 | Parrott | ..................... | E04B 1/58 211/182 |
| 4,955,490 A * | 9/1990 | Schafer | ................ | A47B 57/581 211/187 |
| 5,330,066 A * | 7/1994 | Carroll | ................. | A47B 47/027 211/182 |
| 5,377,851 A * | 1/1995 | Asano | .................. | A47B 47/022 211/191 |
| 5,636,755 A | 6/1997 | Guiher | | |
| 6,085,918 A * | 7/2000 | Duff | ..................... | A47B 57/48 108/109 |
| 6,105,798 A * | 8/2000 | Gruber | .................. | B65G 1/023 211/151 |
| 6,450,350 B1 * | 9/2002 | Krummell, Jr. | ...... | A47B 47/027 211/183 |
| 6,520,357 B1 * | 2/2003 | Kautz | ................. | A47B 96/061 211/151 |
| 7,963,492 B2 * | 6/2011 | Nevins | .................... | F28F 25/00 165/67 |
| 8,443,992 B2 * | 5/2013 | Lawson | ............... | A47B 47/028 211/187 |
| 8,695,816 B2 * | 4/2014 | Troyner | ............... | A47B 57/402 211/103 |
| 8,727,144 B2 * | 5/2014 | Krummell | ................ | B65G 1/02 211/191 |
| 8,733,564 B2 * | 5/2014 | Fitzgerald | .............. | A47B 57/50 211/191 |
| 9,167,896 B1 * | 10/2015 | Wu | ..................... | A47B 96/1441 |
| 9,215,931 B1 * | 12/2015 | Offerman | ............. | A47B 96/021 |
| 9,474,369 B1 * | 10/2016 | Tsai | .................... | A47B 47/0083 |
| 2003/0155319 A1 * | 8/2003 | Wishart | ............... | A47B 47/027 211/189 |
| 2005/0103734 A1 * | 5/2005 | Saltzberg | ............. | A47B 57/50 211/187 |
| 2010/0084354 A1 * | 4/2010 | Eustace | .................. | A47B 57/50 211/134 |
| 2013/0240471 A1 * | 9/2013 | Wiese | .................... | A47B 57/50 211/134 |
| 2014/0116973 A1 * | 5/2014 | Buckley | .................... | A47F 5/00 211/134 |
| 2015/0101998 A1 | 4/2015 | Keck | | |
| 2015/0313357 A1 * | 11/2015 | David | ................ | A47B 47/0083 211/187 |
| 2017/0280875 A1 * | 10/2017 | Buckley | ............. | A47B 96/1441 |
| 2017/0311721 A1 * | 11/2017 | Bruckner | ........... | A47B 96/1441 |

FOREIGN PATENT DOCUMENTS

| | | |
|---|---|---|
| FR | 2 127 499 | 10/1972 |
| JP | 62-130909 A | 6/1987 |
| WO | WO 94/03090 A1 | 2/1994 |
| WO | WO 2013/006879 A2 | 1/2013 |

OTHER PUBLICATIONS

Gerhard Hoenow et al.; "Entwerfen und Gestalten im Maschinenbau"; Feb. 16, 2016; pp. 59-66 (13 pages).

* cited by examiner

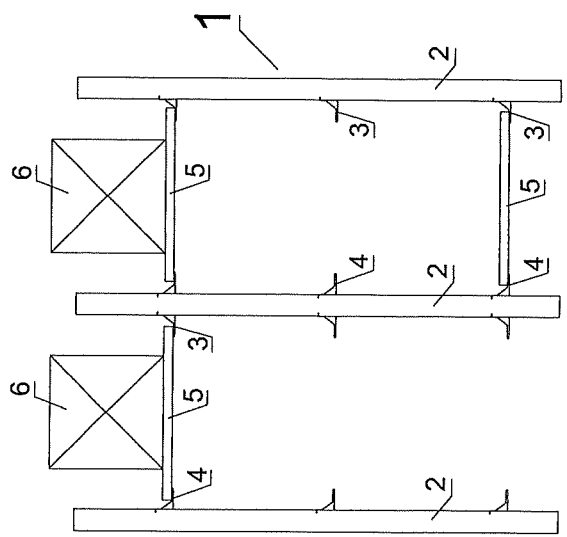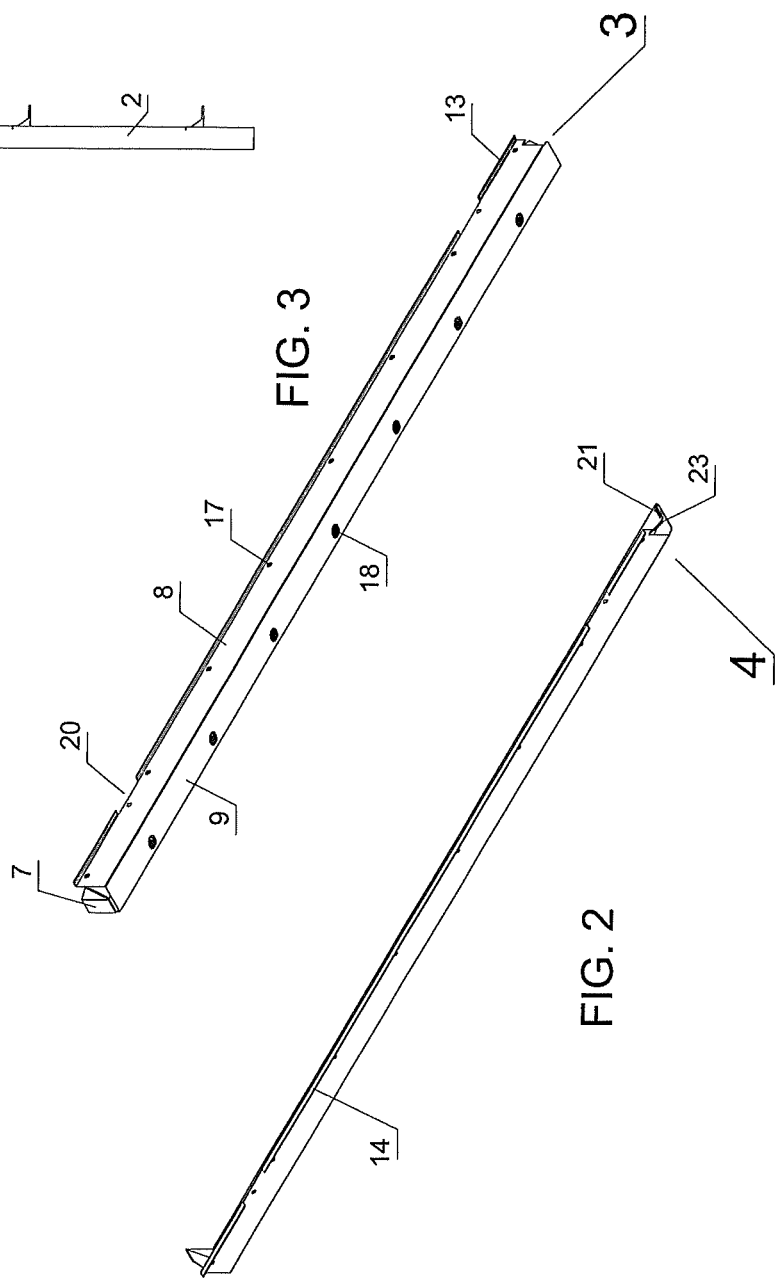

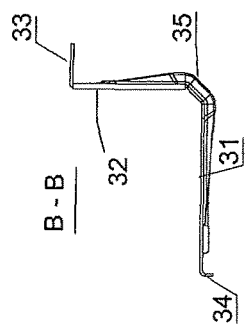
FIG. 11
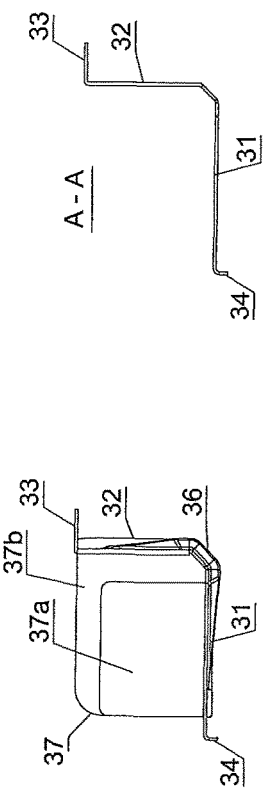
FIG. 10
FIG. 9
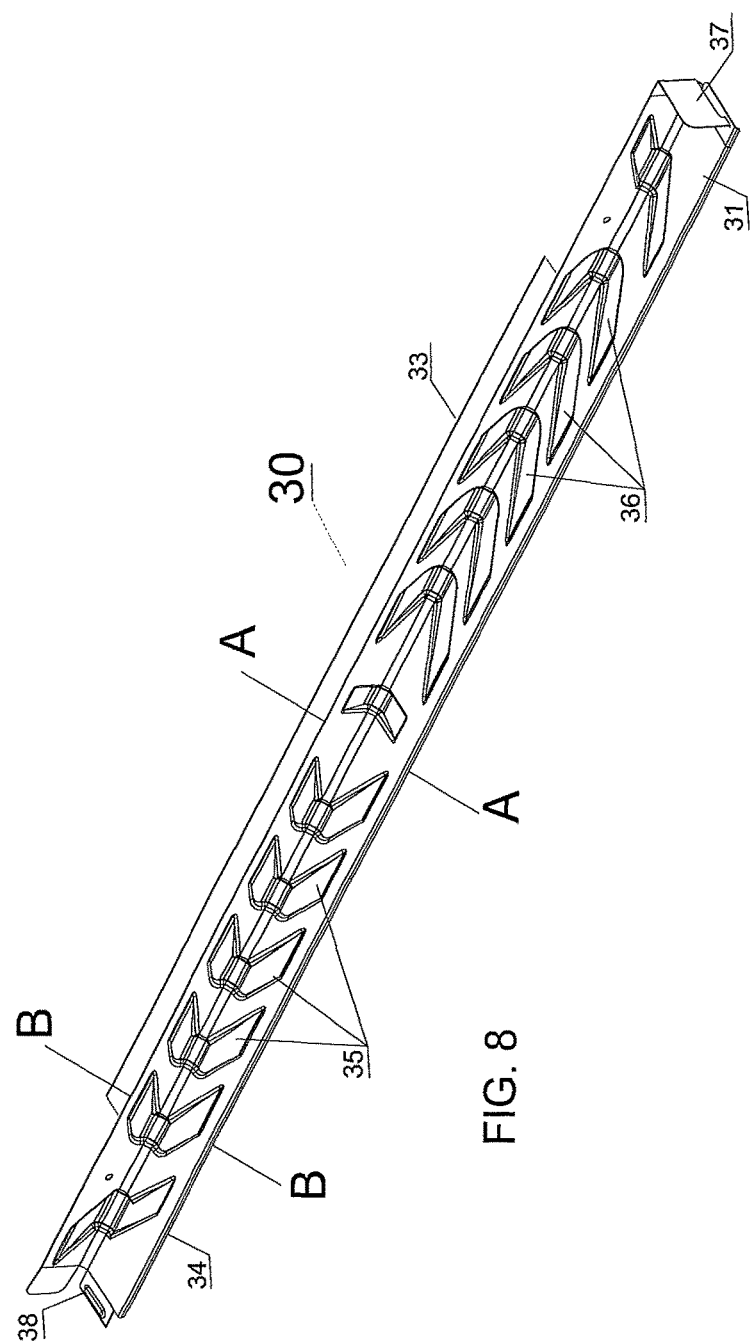
FIG. 8

US 10,299,593 B2

RACK, LOAD CARRIER AND METHOD OF PRODUCTION

BACKGROUND OF THE INVENTION

Field of the Invention

The present invention relates to a rack with uprights and load carriers disposed at the uprights for receiving objects between the uprights on the load carriers. Furthermore, the invention relates to load carriers for a corresponding rack as well as a method for producing corresponding load carriers.

Prior Art

Racks of all kinds are used in many areas. The racks discussed herein are racks for commercial or industrial warehouses with high storage capacities, e.g. for storing merchandise. As a result of the large dimensioning of such racks, which are usually constructed from uprights and shelves or load carriers disposed between them, these racks often have a high weight, which must be dissipated by the building structure. In particular, if heavy goods are to be stored in the rack, the uprights and the load carriers which are disposed on the uprights to store the goods or load carrying means must be appropriately dimensioned, with the result that the weight problem is further aggravated. Moreover, the cost of producing the rack or the load carriers is also increased owing to high material input.

Corresponding load carriers for racks are usually configured as profile angles, wherein one limb of the profile angle is an upright contact surface section which is disposed in abutment against the upright, while the limb which normally protrudes perpendicularly from the upright contact surface section, receives the load and can be correspondingly called a load bearing surface section.

DISCLOSURE OF THE INVENTION

Object of the Invention

It is an object of the present invention to provide a load carrier or a rack with corresponding load carriers and a method for making the load carriers, in which for load carriers, having the same or enhanced load bearing capacity, i.e. correspondingly high strength and especially flexural rigidity, the material input and thus the weight and costs can be reduced.

Technical Solution

This object is achieved by a load carrier having the characteristics of claim 1 as well as a method for making a corresponding load carrier having the characteristics of claim 13 and a rack with the corresponding load carriers having the characteristics 16. Advantageous embodiments are the subject-matter of the dependent claims.

The invention proposes to increase the strength and stiffness and, especially, the flexural rigidity of load carriers with angularly disposed load bearing surface section and upright contact surface section, or, while maintaining the same strength and stiffness, to reduce the dimensions of the load carriers and the material input for them in which reinforcement of the load carrier through the formation of a hollow profile is achieved, in which the load bearing surface section for receiving loads and/or the upright contact surface section for disposition at an upright are part of the hollow profile.

Additionally or alternatively, from a further aspect of the invention for which independent protection is sought, a reinforcement of a load carrier is achieved by the provision of one or more corrugations on the load bearing surface section and/or upright contact surface section. In this connection, the corrugations represent depressions transverse to the load receiving surface of the load bearing surface section or to the upright contact surface of the upright contact surface section, said depressions being produced, e.g., by pressing or deep-drawing.

At one of its ends in the longitudinal direction, a corresponding load carrier can have a push-through guard, wherein the push-through guard can be disposed at the wide side of the load bearing surface section and/or the high side of the upright contact surface section.

The longitudinal direction of the load carrier is defined by its maximum extension, that is, in a direction along both the load bearing surface section and the upright contact surface section. The width of the load carrier is defined by the width of the load bearing surface section which runs transversely to the longitudinal direction and transversely to the upright contact surface section. The upright contact surface section, in turn, runs along the longitudinal direction of the load carrier and the height of the load carrier.

A stop can furthermore be configured at one end of the load carrier in the longitudinal direction, said stop being formed by an elevation of the load bearing surface section extending along the wide side of the load bearing surface section.

In addition to the load bearing surface section and the upright contact surface section, the load carrier can have further reinforcement surface sections, which can run transversely to and/or parallel with the load bearing surface section and/or upright contact surface section. The reinforcement surface sections can be bounding walls of the hollow profile as well as further additional surface sections.

The reinforcement surface sections can be spaced at a distance from or can abut the load bearing surface section and/or upright contact surface section so as to create cavity structures or double wall regions.

A reinforcement surface section can itself be at least double walled in parts.

An inclined surface section extending along the longitudinal direction of the load carrier can be disposed between the load bearing surface section and the upright contact surface section and can in turn be part of the hollow profile of the load carrier. Aside from the reinforcing effect of the inclined surface section, the latter can serve to centre an object disposed on the load carrying means, especially when both load carriers at opposite uprights, which together define a storage location for a load carrying means, are disposed such that the inclined surface sections are facing one another. This ensures that self-centring takes place when a corresponding rack location is loaded with such load carriers.

Between the various surface sections of the load carrier and especially between mutually spaced-apart surface sections of the load carrier, transverse connections can be configured for further reinforcement and increased stability of the load carrier. In particular, one or more transverse connections in the form of clinch connections extending transversely to the respective surfaces can be provided between adjacent, especially parallel, surface sections. Clinch connections are produced by press joining, wherein the surface sections to be joined are deep-drawn and pressed together at the point of contact.

In the case of reinforcement with corrugations, a plurality of corrugations can be provided spaced apart from one another in the longitudinal direction of the load carrier.

The corrugations, which form a trough transverse to the load bearing surface section and/or upright contact surface section, can have any shape with a width and length along the surface of the load bearing surface section and/or upright contact surface section. The depth of the corrugation extends in the direction transverse to the load bearing surface section and/or upright contact surface section.

Correspondingly, the corrugations, by virtue of their shape, e.g., in the longitudinal direction, i.e., in the direction of their maximum extension, can be disposed in a certain position relative to the longitudinal direction of the load carrier, e.g. transversely or at an incline to the longitudinal direction, in order that favourable mechanical behaviour may thereby be attained. In addition, the corrugations can either be provided in the individual surface sections or be disposed so as to overlap, e.g., from the load bearing surface section to the upright contact surface section.

In addition, it is possible for a plurality of corrugations to be identically or differently shaped and oriented, e.g., to be disposed at an angle to one another with respect to their longitudinal extension.

A corresponding method for producing such a load carrier may proceed from sheet metal, e.g. sheet metal wound onto a coil or a sheet-like or panel-shaped starting material. The sheet metal can be formed from any arbitrarily suitable metallic material, whereby all kinds of metal alloys can be used.

The corresponding sheet metal or the sheet metal strip is formed by plastic deformation to a corresponding load carrier having a load bearing surface section for storing loads and upright contact surface sections for disposing the load carrier at one or more uprights of a rack. According to the invention, the sheet metal is formed by profiling in such a way that a hollow profile is formed, wherein the load bearing surface section and upright contact surface section at least partially constitute the hollow profile. Alternatively or additionally, further forming of the sheet metal can be carried out by cutting, especially laser cutting, punching, bending, deep-drawing, pressing and clinching. This applies especially where reinforcement is to be achieved by the formation of corrugations.

In particular, during the production process, a metal strip can be unwound from a coil and sections of it corresponding to the length of the load carriers to be produced can be provided with a cutting pattern, wherein the cutting pattern defines different components of the load carrier for the downstream forming process and the final separation of the load carriers from the continuous sheet metal strip.

The cutting pattern can be generated during continuous unwinding of the sheet metal strip by means of continuous punching or cutting tools and/or by laser cutting. Subsequently, the sheet metal strip can be profiled to the corresponding shape, with the sheet metal strip being formed into the desired shape in several stages as it passes continuously through various forming stations.

When the different surface sections are in the desired form as a result of corresponding bending and folding, the individual load carriers can be separated by appropriately cutting the metal strip, which has by now been converted into a profile.

The load carrier can be machined after separation, especially by bending, cutting and/or clinching. For example, a push-through guard can be produced at one end of the load carrier transversely to the longitudinal extent of the load carrier by bending a section provided correspondingly in the cutting pattern.

BRIEF DESCRIPTION OF THE DRAWINGS

The attached drawings show here in purely schematic form in

FIG. 1 a side view of a rack according to the present invention,

FIG. 2 a perspective representation of a load carrier according to the present invention, FIG. 3 a partial perspective representation of another load carrier according to the present invention, FIG. 4 a sectional view of a load carrier according to the present invention, FIG. 5 a further sectional view of a load carrier according to the present invention, FIG. 6 a further sectional view of a load carrier according to the present invention, and FIG. 7 a detailed view of a rack according to the present invention, FIG. 8 a perspective representation of a second embodiment of a load carrier according to the present invention, FIG. 9 a view from behind of the load carrier from FIG. 8, FIG. 10 a sectional view along the line A-A from FIG. 8; and in FIG. 11 a sectional view along the line A-A from FIG. 8.

EXEMPLARY EMBODIMENTS

Figure 4:
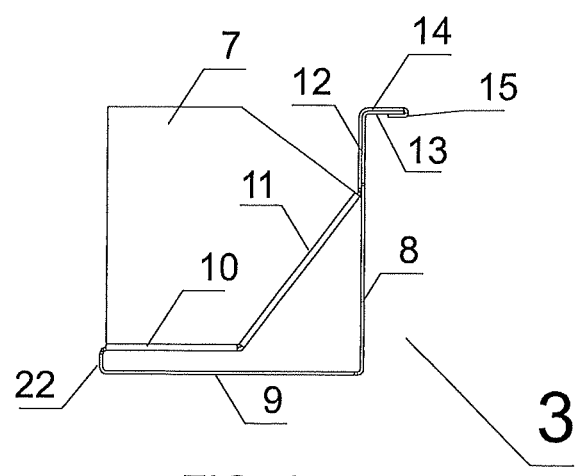

Further advantages, characteristics and features of the present invention will become apparent in the following description of the embodiments, the invention not being limited to these embodiments.

FIG. 1 shows a rack 1 with uprights 2, at which load carriers 3, 4, namely left-hand load carriers 4 and right-hand load carriers 3, are disposed. The left-hand load carriers 4 are disposed on the right of the uprights 2 and are located on the left side of a gap between two uprights 2 while the right-hand load carriers 3 are disposed on the left of the uprights 2 and are located on the right side of the gap between the uprights 2.

The load carriers 3, 4 serve to receive a load carrying means 5 such as a tray, a shelf, a pallet or a comparable apparatus on which items or goods 6 to be stored can be stored. As can be seen from FIG. 1, the illustrated rack has six storage spaces, three of which are occupied by load carrying means 5, and two of which, in turn, carry stored goods 6. The rack 1 can, of course, be designed in such a way that further storage spaces are provided in a direction perpendicular to the image plane, so that, therefore, several load carrying means 5 can be stored one behind the other on the load carriers 3, 4.

FIGS. 2 and 3 show perspective representations of the load carriers 3, 4, with the load carrier 3 only being partially shown in FIG. 3. In FIG. 3, for the purpose of illustrating the structure of a load carrier 3, the upper part of the load carrier 3 has been omitted in order that the lower components may be better represented.

Figure 5:
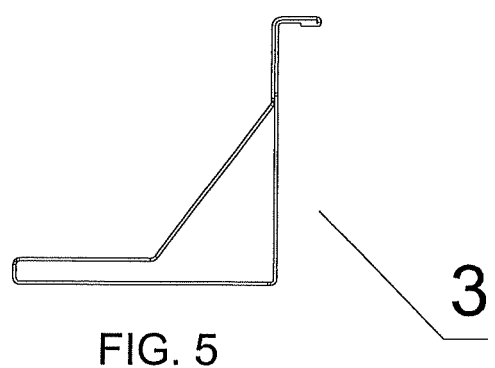
Figure 6:
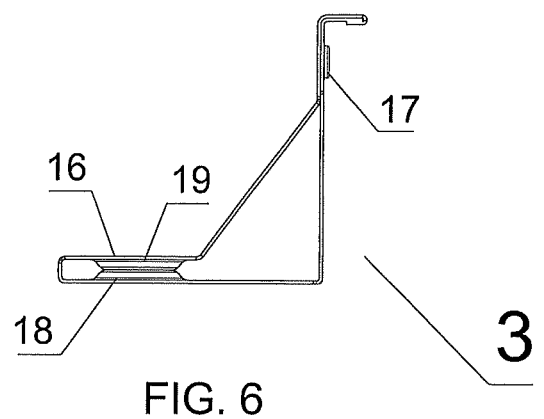
Figure 7:
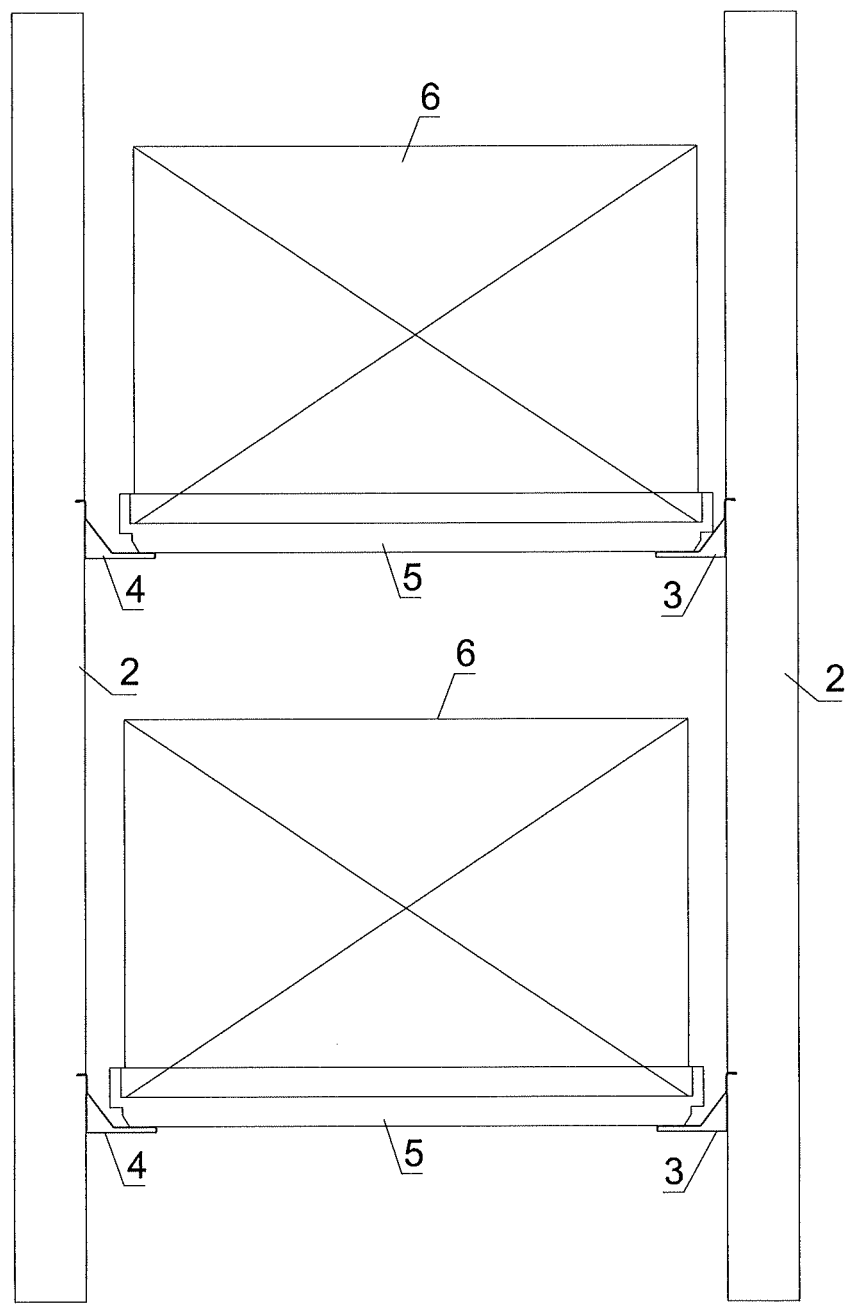

FIGS. 4 to 6 show various sectional representations of a right-hand load carrier 3, wherein the left-hand load carriers 4, as can be seen from FIGS. 2 and 7, are configured as the mirror images of the right-hand load carriers 3.

The load carriers 3, 4 are configured as hollow profiles, whereby, as a result of the hollow profile, high strength, especially flexural rigidity, of the load carriers 3, 4 can be achieved at low material input.

The load carriers 3, 4 each have an upright contact surface section 8 by means of which the load carriers 3, 4 can be disposed at the respective uprights 2 of a rack 1.

In addition, each load carrier 3, 4 has a load bearing surface section 10 on which the load carrying means 5 are stored and which extend transversely, especially perpendicularly, to the upright contact surface section 8. Parallel with and spaced apart from the load bearing surface section 10, the hollow profile of the load carrier 3, 4 has a supporting surface section 9, which correspondingly likewise extends transversely to the upright contact surface section 8 and especially perpendicular thereto. The supporting surface section 9 is directly connected to the upright contact surface section 8 and forms an angle with this, especially an angle of 90°. The supporting surface section 9 is part of the hollow profile and forms a reinforcement surface section for increasing the strength and flexural rigidity of the load carrier 3.4.

At the opposite end of the upright contact surface section 8 in the height direction facing away from the end where the supporting surface section 9 is disposed at the upright contact surface 8, a further angle is configured which, however, is opposed to the angle defined by the upright contact surface section 8 and the supporting surface section 9. This angle is formed by a first reinforcement surface section 13, which extends transversely, especially perpendicularly, to the upright contact surface section 8, opposite the supporting surface section 9 and parallel thereto.

The load bearing surface section 10 is configured parallel with and spaced apart from the supporting surface section 9, wherein the load bearing surface section 10 and the supporting surface section 9 are connected to each other via a connecting fillet 22 extending transversely between the ends of the load bearing surface section 10 and the supporting surface section 9. The load bearing surface section 10 and the supporting surface section 9 may also be disposed so as not to be configured parallel with each other, even though the preferred embodiment shows this in FIGS. 4 to 6.

In the illustrated embodiment, the load bearing surface section 10 does not extend across the same width as the supporting surface section 9 in cross-section, but rather only across a part of the supporting area section 9 in a direction transverse to the longitudinal extension of the load carrier 3, 4, i.e. in a direction which, in the case of load carriers 3, 4, which are installed in a rack 1, extends across the storage space in rack 1 between the uprights 2. Rather, that end of the load bearing surface section 10 which is opposite the end with the connecting fillet 22 is connected to an inclined surface section 11, which extends at a sharp angle to the supporting surface section 9 and to the upright contact surface section 8 such that, at least part of the supporting surface section 9, the inclined surface section 11, and at least part of the upright contact surface section 8 form a triangular shape in the cross-section, which constitutes the essential cavity of the hollow profile of the load carrier 3, 4.

Adjacent the inclined surface section 11 is a double wall section 12, which extends parallel with the upright contact surface section 8. Parallel with the first reinforcement surface section 13 is provided a second reinforcement surface section 14, which extends transversely, especially perpendicularly, to the double wall section 12, from the latter and which forms a double-wall area with the first reinforcement surface section 13. The second reinforcement surface section 14 adjoins an edge section 15, which surrounds the first reinforcement surface section 13 in a U-shape in the cross-section.

As can be clearly seen from FIGS. 4 to 6, the hollow profile of the load carrier 3, 4 is formed from a sheet metal strip, which is brought into the corresponding shape by means of corresponding bends and folding, i.e. profiling. In the cross-section through a metal strip serving as starting material, the first reinforcement surface section 13, the upright contact surface section 8, the supporting surface section 9, the connecting fillet 22, the load bearing surface section 10, the inclined surface section 11, the double wall section 12 and the second reinforcement surface section 14, as well as the edge section 15, are connected together and disposed adjacent one another and are brought into the hollow profile shape shown by corresponding bending and folding. The first and second reinforcement surface section 13, 14, the supporting surface section 9, the connecting fillet 22, the inclined surface section 11 and the double wall section 12, as well as the edge section 15 each constitute reinforcement surface sections for increasing the strength and flexural rigidity in accordance with the present invention.

FIG. 5 shows a sectional view without the push-through guard 7, which is disposed at one end of the load carrier 3, 4 in order that the load-handler 5 and the goods 6 stored thereon may be prevented from being pushed into the storage spaces formed by the load carriers 3, 4.

As can be seen from FIGS. 2 and 3 as well as from FIG. 4, the push-through guard 7 is formed by a wall section which extends transversely to the longitudinal extension of the load carrier 3, 4 at one end of the load carrier 3, 4 and is simultaneously configured transversely to the load bearing surface section 10 and to the upright contact surface section 8. The push-through guard 7 can also be produced by corresponding bending and folding of a metal strip, wherein the bending axis runs transversely to the longitudinal extension of the load carrier 3, 4. Accordingly, the push-through guard 7, after the profiling of a continuous metal strip into the hollow profile shape and the cutting off of the load carrier from the continuous metal strip in line with the desired length of the load carrier 3, 4, is generated by bending one or more sections of the metal strip which were already generated before the profiling of the continuous metal strip in the blank of the continuous metal strip, e.g. by punching or laser cutting. Alternatively, the push-through guard can be disposed by an additional component and/or subsequently after the profiling.

The push-through guard 7 is also not shown in FIG. 6. However, what is shown in this figure is that, along the longitudinal extension of the load carrier 3, 4, the load bearing surface section 10 and the supporting surface section 9 have several clinch connections 16 which are spaced apart from one another and which are produced by press-joining or clinching corresponding regions of the load bearing surface section 10 and the supporting surface section 9. In press-joining, the corresponding areas, e.g. circular sections, of the load bearing surface section 10 and the supporting surface section 9, are deep-drawn and pressed together to create a connection between the load bearing surface section 10 and the supporting surface section 9. As a result, the strength and stability of the load carrier 3, 4 can be further increased.

FIG. 6 shows the clinched area 19 of the load bearing surface section 10 and the clinching section 18 of the supporting surface section 9. The rigidity of the hollow profile of the load carriers 3, 4 can be further increased by the several clinch connections 16 spaced apart from one another along the longitudinal extension, as is also shown in FIG. 3 with the representation of the clinching sections 18 of the supporting surface section 9.

The load carrier 3, 4 also has further clinch connections 17, which are also spaced apart from one another along the longitudinal extension of the load carrier 3, 4 and which serve to connect the double wall section 12 and the upright contact surface section 8. Thus, the connection of the ends of the metal strip can be additionally stabilised by means of the edge section 15. At the same time, through-openings for rivet connections to the uprights 2 of the rack 1 can be configured in these clinch connections 17, said connections of course also being separately configurable.

Since the first reinforcement surface section 13 and the second reinforcement surface section 14 with the folded edge section 15 protrude from the upright contact surface section 8, provision is made for one or more cut-outs 20 for accommodating the uprights 2 of the rack 1 in the load carrier 3, 4, wherein, the first reinforcement surface section 13 and the second reinforcement surface section 14 as well as the folded edge section 15 are cut out and removed to form a space for receiving an upright 2.

As can be seen in FIG. 2, a stop 21, a so-called front stop or container stop, can be configured at that end of the load carrier 3, 4 which is opposite to the end at which the push-through guard 7 is provided, said stop being configurable as a protrusion protruding from the load bearing surface section 10 to prevent the load carrying means 5 from sliding out of the rack at the open end of the load carrier 3, 4.

Furthermore, on the front side of the load carrier 3, 4 opposite to the push-through guard 7, an inclined surface 23 can be configured on the inclined surface section 11, said inclined surface constituting a surface section which expands the insertion opening between two corresponding load carriers 3, 4, i.e. a left-hand load carrier 4 and a right-hand load carrier 3, to facilitate easy insertion of a load carrying means 5. Accordingly, the inclined surface 23 is disposed at a slant to the front and at a slant in the direction of the upright contact surface section 8 at the inclined surface section 11.

FIG. 7 shows in greater detail the disposition of the load carriers 3, 4 at the uprights 2 of a rack 1, wherein it is shown that automatic centring of the received load carrying means 5 can be achieved by the inclined surface sections 11. In the lower storage position of FIG. 7, the load carrying means 5 with the goods 6 to be stored is disposed dead centre between two load carriers 3, 4, while the load carrying means 5 with the goods 6 to be stored is stored off-centre in the upper storage position of FIG. 7, more precisely being displaced in the direction of the right-hand load carrier 3. However, the inclined surface section 11 prevents the load carrying means 5 from being further displaced in the direction of the right-hand load carrier 3, so that there is no risk that the load-receiving surface section 10 will be exited on the other side at the left-hand load carrier 4.

FIG. 8 shows a perspective view of a second embodiment of a load carrier 30 in which the increased strength and flexural rigidity are not achieved by the configuration of a cavity, but by the provision of corrugations 35, 36, which are configured as trough-like depressions on the load bearing surface section 31 and the upright contact surface section 32. In the embodiment shown, the corrugations 35, 36 extend from the load bearing surface section 31 to the upright contact surface section 32, and are thus configured across the surface section boundaries. Instead of this embodiment shown in FIG. 8, however, it is also possible for the corrugations to be disposed only on the load bearing surface section 31 or on the upright contact surface section 32. In addition, the load carrier 30 of the second embodiment has further reinforcement surface sections, namely a third reinforcement surface section 33 and a fourth reinforcement surface section 34, each of which is angularly disposed at the longitudinal side of the load bearing surface section 31 or the upright contact surface section 32. In the embodiment shown, the third and fourth reinforcement surface section are each at right angles to the respective load bearing surface section 31 or upright contact surface section 30, as can be seen especially from FIGS. 9 to 11.

To allow the upright contact surface section 32 to make direct contact with an upright, the third reinforcement surface section 33 has recesses in which the corresponding uprights come to rest.

As in the case of the first embodiment, the second embodiment also has a push-through guard 37 disposed at one end of the load carrier in the longitudinal direction of the load carrier 30, and at the other end is disposed a stop 38 to securely receive a load carrying means 5 or the corresponding goods on the load carriers.

FIG. 9 shows the load carrier 30 from the rear side, that is to say from that end which has the push-through guard 37. In the view of FIG. 9, the corrugation 36 can be seen extending continuously from the load bearing surface section 31 to the upright contact surface section 32 with a corresponding depression transverse to the load bearing surface of the load surface section 31 and to the upright contact area of the upright contact area section 32. Also to be seen are the reinforcement surface sections 33 and 34, which each extend at right angles at the longitudinal sides of the load bearing surface section 31 or of the upright contact surface section 32 and away from the load bearing surface or towards the upright contact surface.

As can also be seen in FIG. 9, the push-through guard 37 is configured in two parts, namely with a first part 37a and a second part 37b. The first part 37a is disposed at the load bearing surface section 31 and can be made by simply bending a corresponding section after the shaping of the load carrier. In addition, the push-through guard 37 has a second part 37b, which is disposed at the upright contact surface section 32 and can likewise be produced by corresponding bending after shaping of the load carrier.

FIGS. 10 and 11 show two sectional views along the lines A-A and B-B from FIG. 8, wherein the difference between an area in which there is no corrugation (FIG. 10) and the region in which a corrugation 35 is configured, becomes clear.

As can be seen in FIG. 11, the corrugation 35 is formed as a trough in the load bearing surface section 31 and the upright contact surface section 32.

In FIG. 8, the corrugations 35 and 36 are shown as rectangular strips. However, it is self-evident to the person skilled in the art that the corrugations can have different shapes.

Moreover, the corrugations 35 and 36 are disposed in different orientations at the load carrier 30, wherein a longitudinal direction, which is defined by the maximum extension of the corrugation 35, 36, is disposed at an incline to the longitudinal direction of the load carrier 30. In addition, the corrugations 35, which are aligned parallel with one another and the corrugations 36, which in turn are aligned parallel with one another, are mutually disposed at an angle such that the longitudinal directions of the corrugations 35, 36 enclose an acute angle with one another. Due to the different orientation of the corrugations 35, 36, the reinforcement effect can be further increased.

Although the present invention has been described in detail with reference to the embodiments, it is self-evident to the person skilled in the art that the invention is not limited to these embodiments, but rather that modifications are possible without departing from the scope of the appended claims, involving the omission of individual characteristics or that other types of combinations of characteristics are made. The present disclosure comprises all combinations of the presented individual characteristics.

LIST OF REFERENCE NUMERALS 1 rack
2 upright
3 right-hand load carrier
4 left-hand load carrier
5 load carrying means
6 goods
7 push-through guard
8 upright contact surface section
9 supporting surface section
10 load bearing surface section
11 inclined surface section
12 double wall section
13 first reinforcement surface section
14 second reinforcement surface section
15 edge section
16 clinch connection
17 clinch connection
18 clinch section
19 clinched area
20 cut-out
21 stop
22 connecting fillet
23 inclined surface
30 load carrier
31 load bearing surface section
32 upright contact surface section
33 third reinforcement surface section
34 fourth reinforcement surface section
35 corrugations
36 corrugations
37 push-through guard
37a, 37b parts of the push-through guard
38 stop

The invention claimed is:

1. A load carrier for a rack for disposition at at least one rack upright and for receiving loads, the load carrier comprising a length in a longitudinal direction of the load carrier which is defined by a maximum extension of the load carrier, a width which runs transversely to the longitudinal direction and a height, the load carrier further comprising a load bearing surface section for storing loads and an upright contact surface section for disposition of the load carrier at the at least one rack upright, wherein the load bearing surface section extends along the length and the width of the load carrier and the upright contact surface section extends along the length and the height of the load carrier, the load carrier is formed from a sheet metal strip into a hollow profile enclosing a cavity in cross-section by profiling, wherein the sheet metal strip comprises a first reinforcement surface section at a first longitudinal edge of the sheet metal strip and a second reinforcement surface section opposite to the first reinforcement surface section at an edge section along a second longitudinal edge of the sheet metal strip, wherein the first reinforcement surface section and the second reinforcement surface section are in contact to each other after profiling the sheet metal strip into the hollow profile, wherein the load bearing surface section and the upright contact surface section are disposed transversely to each other, wherein for reinforcement of the load carrier, at least one of the load bearing surface section and the upright contact surface section are part of the hollow profile.

2. The load carrier in accordance with claim 1, wherein a push-through guard extending transversely to the longitudinal direction of the load carrier is located at one end of the load carrier.

3. The load carrier in accordance with claim 1, wherein at one end of the load carrier is disposed a stop extending along a side of the load bearing surface section.

4. The load carrier in accordance with claim 1, wherein at least partly along the longitudinal direction of the load carrier are disposed at least one of the reinforcement surface sections that extends at least one of transversely to and parallel with at least one of the load bearing surface section and the upright contact surface section.

5. The load carrier in accordance with claim 4, wherein the at least one of the reinforcement surface sections is spaced at a distance from or is disposed in abutment with at least one of the load bearing surface section and the upright contact surface section.

6. The load carrier in accordance with claim 4, wherein at least part of the reinforcement surface sections is configured as a double wall.

7. The load carrier in accordance with claim 1, wherein between the load bearing surface section and the upright contact surface section is disposed an inclined surface section extending along the longitudinal direction of the load carrier, wherein the inclined surface section is part of the hollow profile.

8. The load carrier in accordance with claim 4, wherein the reinforcement surface sections form a portion of the hollow profile.

9. The load carrier in accordance with claim 1, wherein the load carrier, at adjacent surfaces, has at least one connection extending transversely to the longitudinal direction of the load carrier.

10. The load carrier in accordance with claim 1, wherein the load carrier has several corrugations spaced apart from one another in the longitudinal direction.

11. The load carrier in accordance with claim 10, wherein the corrugations transverse to at least one of the load bearing surface section and the upright contact surface section form a trough.

12. The load carrier in accordance with claim 10, wherein the several corrugations are disposed at an angle to one another with respect to a corrugation longitudinal direction of the corrugations.

13. A method for producing a load carrier for a rack for disposition at at least one rack upright, the method comprising forming the load carrier from a sheet metal strip, such that the load carrier comprises a length in a longitudinal direction of the load carrier which is defined by a maximum extension of the load carrier, a width which runs transversely to the longitudinal direction and a height, and such that a load bearing surface section for storing loads and an upright contact surface section for disposition of the load carrier at the at least one rack upright are configured, wherein the load bearing surface section extends along the length and the width of the load carrier and the upright contact surface section extends along the length and the height of the load carrier, wherein the load bearing surface section and the upright contact surface section are disposed transversely to each other to form a support bracket, wherein forming of the sheet metal strip occurs by profiling of the sheet metal strip to yield a hollow profile enclosing a cavity in cross-section, wherein the sheet metal strip comprises a first reinforcement surface section at a first longitudinal edge of the sheet metal strip and a second reinforcement surface section opposite to the first reinforcement surface section at an edge section along a second longitudinal edge of the sheet metal strip, wherein the first reinforcement surface section and the second reinforcement surface section are in contact to each other after profiling the sheet metal strip into the hollow profile, wherein the at least one of the load bearing surface section and the upright contact surface section are at least part of the hollow profile.

14. The method in accordance with claim 13, further including unwinding the sheet metal strip from a coil, subsequently profiling the sheet metal strip during continuous transport through a forming machine, and, after the profiling, cutting the hollow profile produced into the load carrier.

15. The method in accordance with claim 14, wherein the load carrier is further machined after the cutting.

16. A rack with several rack uprights and several load carriers in accordance with claim 1, which are disposed at the rack uprights.

* * * * *